(12) United States Patent
Imamura et al.

(10) Patent No.: US 8,342,640 B2
(45) Date of Patent: Jan. 1, 2013

(54) IMAGE FORMING METHOD

(75) Inventors: Mika Imamura, Kanagawa (JP); Yoshimitsu Arai, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 219 days.

(21) Appl. No.: 12/843,046

(22) Filed: Jul. 26, 2010

(65) Prior Publication Data

US 2011/0050788 A1    Mar. 3, 2011

(30) Foreign Application Priority Data

Aug. 28, 2009 (JP) ................... 2009-198495

(51) Int. Cl.
*B41J 2/165* (2006.01)
(52) U.S. Cl. ............... 347/33; 347/17; 347/47
(58) Field of Classification Search .............. 347/28, 347/17, 19, 47
See application file for complete search history.

(56) References Cited

U.S. PATENT DOCUMENTS 7,344,220 B2 *  3/2008  Moynihan ............... 347/28
2008/0165237 A1 *  7/2008  Yamauchi et al. ........... 347/102

FOREIGN PATENT DOCUMENTS

JP    2005-220352 A    8/2005

* cited by examiner

*Primary Examiner* — Lamson Nguyen
(74) *Attorney, Agent, or Firm* — SOLARIS Intellectual Proprty Group, PLLC

(57) ABSTRACT

The present invention provides an image forming method including jetting an ink composition containing a pigment, a volatile water-soluble organic solvent, polymer particles and water, from a heated nozzle plate of an inkjet head onto a recording medium; and applying a maintenance liquid on a nozzle surface of the nozzle plate after jetting.

10 Claims, No Drawings

IMAGE FORMING METHOD

CROSS-REFERENCE TO RELATED APPLICATION

This application claims priority under 35 USC 119 from Japanese Patent Application No. 2009-198495 filed on Aug. 28, 2009, the disclosure of which is incorporated by reference herein.

BACKGROUND OF THE INVENTION

1. Field of the Invention

The invention relates to an image forming method for forming an image by jetting ink from an inkjet head equipped with a nozzle plate having ejection orifices (nozzles) for ink provided therein.

2. Related Art

Various information processing systems have been developed concomitantly with the rapid progress in the information technology industry of recent years, and in addition, recording methods and recording apparatuses appropriate for the respective information processing systems are being put to practical use.

Among these, inkjet recording methods have been widely used because of their advantages that recording can be carried out in a variety of materials, that the hardware (apparatus) is relatively inexpensive and compact, that the method is excellently quiet, and the like. Recording performed by using an inkjet recording method also makes it possible to obtain so-called photograph-like high quality recorded matters. Furthermore, inkjet recording methods making use of pigment inks are generally considered to have better keeping qualities than inkjet recording methods making use of dye inks.

Accordingly, a method for forming an image on a non-porous substrate other than paper substrate, for example, a plastic substrate, using an inkjet method has been recently proposed. For example, an inkjet ink containing a pigment colorant bound to a polymer, and a water-based liquid vehicle containing acid-functionalized polymer colloidal particles and a volatile co-solvent having a boiling point of 285° C. or lower have been disclosed, and this inkjet ink is considered to have excellent adherence to non-porous substrates (see, for example, Japanese Patent Application Laid-Open (JP-A) No. 2005-220352).

SUMMARY

The present invention has been made in view of the above circumstances and provides an image forming method including jetting an ink composition containing a pigment, a volatile water-soluble organic solvent, polymer particles and water, from a heated nozzle plate of an inkjet head onto a recording medium; and applying a maintenance liquid on a nozzle surface of the nozzle plate after jetting.

DETAILED DESCRIPTION OF THE INVENTION

Hereinafter, the image forming method of the invention will be described in detail.

The image forming method of the invention is constituted to include jetting an ink composition containing a pigment, a volatile water-soluble organic solvent, polymer particles and water, from a heated nozzle plate of an inkjet head onto a recording medium (hereinafter, may be referred to as "ink jetting step"), and applying a maintenance liquid on a nozzle surface of the nozzle plate after jetting (hereinafter, may be referred to as "maintenance liquid applying step"). The image forming method of the invention can be constituted to further include other steps, as necessary.

The term "maintenance" according to the invention includes maintaining the inkjet head that ejects an ink composition for inkjet recording, and its jetting performance, to be in an anticipated state or a state close thereto, and sustaining the state (maintenance), as well as washing the head for recording (cleaning), and repairing and maintaining the head in a better state. The maintenance liquid also includes a washing liquid for washing out an ink composition.

When the ink composition contains a volatile water-soluble organic solvent and polymer particles as ink components, the polymer particles can increase the adhesiveness of image by depositing on the recording medium upon image formation. On the other hand, if the temperature of the atmosphere for image formation is high, and the nozzle plate that ejects ink is in a heated state, a circumstance is created in which the organic solvent vaporizes due to the volatility of the organic solvent, and the polymer component adheres and dries at the nozzle surface, thereby readily forming a coating film. Therefore, maintenance is made even more difficult. However, according to the invention, in the case of such a recording system, as the image forming method particularly includes applying a maintenance liquid to the nozzle surface after jetting, it is made easier to remove any dried-up ink by softening, redispersing, dissolving or the like, so that stabilized jetting can be achieved even with an ink containing polymer particles.

—Ink Jetting Process—

The ink jetting process involves jetting an ink composition containing a pigment, a volatile water-soluble organic solvent, polymer particles and water (hereinafter, simply referred to as "ink composition"), from heated nozzle plate of an inkjet head onto a recording medium using an inkjet recording apparatus equipped with an inkjet head.

In the case of forming an image by jetting an ink, the temperature at the nozzle plate that ejects ink or at the surroundings is increased or regulated to a predetermined temperature or above, in order to fix the image by evaporating at least a portion of water and the volatile water-soluble organic solvent. Accordingly, the nozzle plate itself undergoes temperature elevation. The temperature of the nozzle plate (for example, temperature at the nozzle surface) is preferably higher than or equal to a temperature at which the ink spreads into a film when heated at least at the time of ink jetting, because of the reason described above. When the nozzle plate is heated to a temperature higher than or equal to the predetermined temperature, and the temperature is higher than or equal to the film forming temperature of the polymer particles in the ink composition, the water-soluble organic solvent in the ink composition vaporizes, and thereby the amount of the polymer component adhering to the nozzle surface increases. At the same time, film formation occurs, which is prone to bring about nozzle clogging, and the ink composition sticks to the nozzle surface, so that it becomes difficult to carry out maintenance.

The temperature of the nozzle plate (for example, nozzle surface) is preferably 30° C. or higher, and more preferably 40° C. or higher, from the same reasons. The upper limit of the temperature of the nozzle plate is preferably 100° C.

Inter alia, from the viewpoint of stably maintaining ink jettability over a long time, it is more preferable that the temperature of the nozzle plate be 30 to 100° C., and that the boiling point of the water-soluble organic solvent in the ink be 150 to 285° C., while it is even more preferable that the temperature of the nozzle plate be 40 to 70° C., and that the boiling point of the water-soluble organic solvent in the ink be 200 to 250° C.

Here, the temperature of the nozzle plate is a value obtained by measuring the temperature at the nozzle surface.

The inkjet method may be any of known methods such as, for example, a charge control method of jetting an ink by making use of electrostatic attraction force; a drop-on-demand method of utilizing the vibration pressure of a piezo element (pressure pulse method); an acoustic inkjet method of converting electric signals into an acoustic beam, irradiating an ink with the acoustic beam, and jetting the ink using radiation pressure; and a thermal inkjet (BUBBLEJET (registered trademark)) method of heating an ink to form air bubbles, and utilizing the pressure resulting therefrom. The inkjet head may be an inkjet head used in an on-demand system or a continuous system, and the jetting method may be any of an electric-mechanical conversion method (for example, single cavity type, double cavity type, bender type, piston type, share mode type, shared wall type, or the like), an electric-thermal conversion method (for example, thermal inkjet type, BUBBLEJET (registered trademark) type, or the like), an electrostatic attraction method (for example, electric field control type, slit jet type or the like), an electric discharge method (for example, spark jet type or the like) and the like.

The method of bringing the temperature of the nozzle plate into an elevated state is not particularly limited, but a conventionally used heating means may be applied. For example, a method of contacting the nozzle plate with dry air may be mentioned.

—Ink Composition—

The ink composition according to the invention contains polymer particles, a pigment, a volatile water-soluble organic solvent, and water. The ink composition can also be constituted using other additional components such as surfactants, as necessary.

(Polymer Particles)

The ink composition according to the invention contains at least one kind of polymer particles. Thereby, the scratch resistance of the formed images is effectively enhanced, and in the case of jetting the ink composition by means of a nozzle plate in a state of being heated to a predetermined temperature, drying of the ink can occur easily, which in turn easily brings about viscosity increase, solidification and the like, and further enhances the washing effect provided by the maintenance liquid.

The polymer particles may be particles of a resin having an anionic group, examples of which include thermoplastic, thermosetting or modified resins of an acrylic resin, an epoxy resin, a polyurethane resin, a polyether resin, a polyamide resin, an unsaturated polyester resin, a phenolic resin, a silicone resin or a fluororesin; a polyvinyl-based resin such as vinyl chloride, vinyl acetate, polyvinyl alcohol or polyvinyl butyral; a polyester resin such as an alkyd resin or a phthalic acid resin; an amino-based material such as a melamine resin, a melamine-formaldehyde resin, an aminoalkyd co-condensed resin, or a urea resin; and copolymers or mixtures of those resins. Among these, an anionic acrylic resin is obtained by, for example, polymerizing an acrylic monomer having an anionic group (anionic group-containing acrylic monomer), and if necessary, another monomer which can be copolymerized with the anionic group-containing acrylic monomer, in a solvent. The anionic group-containing acrylic monomer may be an acrylic monomer having one or more selected from the group of, for example, a carboxyl group, a sulfonic acid group and a phosphonic acid group. Among them, an acrylic monomer having a carboxyl group (for example, acrylic acid, methacrylic acid, crotonic acid, ethacrylic acid, propylacrylic acid, isopropylacrylic acid, itaconic acid, fumaric acid or the like) is preferred, and particularly, acrylic acid or methacrylic acid is preferred.

The polymer particles are preferably self-dispersing polymer particles, and more preferably self-dispersing polymer particles having a carboxyl group, from the viewpoints of jetting stability and of liquid stability (particularly, dispersion stability) in the case of using a pigment. The self-dispersing polymer particles mean the particles of a water-insoluble polymer which can be brought to a dispersed state in a water-based medium due to the functional group (particularly, an acidic group or a salt thereof) carried by the polymer itself in the absence of other surfactants, and does not contain any free emulsifying agent.

The term dispersed state includes both an emulsified state (emulsion) in which the water-insoluble polymer is dispersed in a liquid state in the water-based medium, and a dispersed state (suspension) in which the water-insoluble polymer is dispersed in a solid state in the water-based medium. The water-insoluble polymer according to the invention is preferably a water-insoluble polymer which can be brought to a dispersed state in which the water-insoluble polymer is dispersed in a solid state, from the viewpoints of the rate of aggregation and fixability obtainable when the water-insoluble polymer is used in an ink composition.

The dispersed state of self-dispersing polymer particles means a state in which it can be visually confirmed that the dispersed state is stably maintained for at least one week at 25° C., even after a solution prepared by dissolving 30 g of a water-insoluble polymer in 70 g of an organic solvent (for example, methyl ethyl ketone), a neutralizing agent that can neutralize 100% of the salt-forming group of the water-insoluble polymer (if the salt-forming group is anionic, sodium hydroxide; if the salt-forming group is cationic, acetic acid), and 200 g of water are mixed and stirred (apparatus: stirring apparatus equipped with a stirring blade, speed of rotation 200 rpm, for 30 minutes, 25° C.), and then the organic solvent is removed from the mixture liquid.

Furthermore, the water-insoluble polymer means a polymer which, when dried for 2 hours at 105° C. and then dissolved in 100 g of water at 25° C., gives an amount of dissolution of 10 g or less. The amount of dissolution of the water-insoluble polymer may be preferably 5 g or less, and more preferably 1 g or less. The term amount of dissolution is an amount of dissolution obtainable when the water-insoluble polymer is neutralized 100% with sodium hydroxide or acetic acid in accordance with the type of the salt-forming group of the polymer.

The water-based medium is constituted to include water, and if necessary, may include a hydrophilic organic solvent. According to the invention, the water-based medium is preferably composed of water and a hydrophilic organic solvent at a proportion of 0.25% by mass or less based on water, and is more preferably composed of water only.

The main chain skeleton of the water-insoluble polymer is not particularly limited, and for example, a vinyl polymer, or a condensed polymer (an epoxy resin, polyester, polyurethane, polyamide, cellulose, polyether, polyurea, polyimide, polycarbonate or the like) can be used. Among them, a vinyl polymer is particularly preferred.

Suitable examples of the vinyl polymer and the monomer constituting the vinyl polymer include those described in Japanese Patent Application Laid-Open (JP-A) Nos. 2001-181549 and 2002-88294. Furthermore, a vinyl polymer having a dissociable group introduced at the termini of the polymer chain, obtained by radical polymerization of a vinyl monomer using a chain transfer agent, a polymerization initiator or an iniferter, each having a dissociable group (or a substituent that can be derived into a dissociable group), or by ionic polymerization using a compound based on any of an initiator or a terminator, each having a dissociable group (or a substituent that can be derived into a dissociable group) can also be used.

Suitable examples of the condensed polymer and the monomer constituting the condensed polymer include those described in Japanese Patent Application Laid-Open (JP-A) No. 2001-247787.

It is preferable that the self-dispersing polymer particles contain a water-insoluble polymer which contains a hydrophilic constituent unit and a constituent unit derived from an aromatic group-containing monomer, from the standpoint of self-dispersibility and an enhancement of washability of a less-washable ink.

The hydrophilic constituent unit is not particularly limited as long as it is derived from a hydrophilic group-containing monomer, and the hydrophilic constituent unit may be derived from a single kind of hydrophilic group-containing monomer, or may be derived from two or more kinds of hydrophilic group-containing monomers. The hydrophilic group is not particularly limited, and may be a dissociable group or a nonionic hydrophilic group.

The hydrophilic group according to the invention is preferably a dissociable group, and more preferably an anionic dissociable group, from the viewpoints of accelerating self-dispersion and the stability of the emulsified or dispersed state formed. Examples of the dissociable group include a carboxyl group, a phosphoric acid group, a sulfonic acid group, and the like, and among them, a carboxyl group is preferred from the viewpoint of fixability obtainable when an ink composition is constituted from the polymer.

The hydrophilic group-containing monomer is preferably a dissociable group-containing monomer, and more preferably a dissociable group containing monomer having a dissociable group and an ethylenically unsaturated bond, from the viewpoint of self-dispersibility and aggregatability. Examples of the dissociable group-containing monomer include an unsaturated carboxylic acid monomer, an unsaturated sulfonic acid monomer, an unsaturated phosphoric acid monomer, and the like.

Specific examples of the unsaturated carboxylic acid monomer include acrylic acid, methacrylic acid, crotonic acid, itaconic acid, maleic acid, fumaric acid, citraconic acid, 2-methacryloyloxymethylsuccinic acid, and the like. Specific examples of the unsaturated sulfonic acid monomer include styrenesulfonic acid, 2-acrylamido-2-methylpropanesulfonic acid, 3-sulfopropyl(meth)acrylate, bis(3-sulfopropyl)-itaconic acid ester, and the like. Specific examples of the unsaturated phosphoric acid monomer include vinylphosphonic acid, vinyl phosphate, bis(methacryloxyethyl)phosphate, diphenyl-2-acryloyloxyethyl phosphate, diphenyl-2-methacryloyloxyethyl phosphate, dibutyl-2-acryloyloxyethyl phosphate, and the like.

Among the dissociable group-containing monomers, unsaturated carboxylic acid monomers are preferred from the viewpoints of dispersion stability and jetting stability, and acrylic acid and methacrylic acid are more preferred.

In the case of forming an image by contacting the self-dispersing polymer particles with an acidic treating liquid and thereby accelerating the aggregation reaction, it is preferable that the self-dispersing polymer particles contain a polymer having a carboxyl group in view of the rate of aggregation of the particles, and it is more preferable that the self-dispersing polymer particles contain a polymer having a carboxyl group and having an acid value of 25 to 100 mg KOH/g. Furthermore, the acid value is more preferably 25 to 80 mg KOH/g, and particularly preferably 30 to 65 mg KOH/g, in view of the rate of aggregation upon the contact between the self-dispersing polymer particles and the aggregating liquid.

The aromatic group-containing monomer is not particularly limited as long as it is a compound containing an aromatic group and a polymerizable group. The aromatic group may be a group derived from an aromatic hydrocarbon, or may be a group derived from an aromatic heterocyclic ring. According to the invention, it is preferable that the aromatic group be an aromatic group derived from an aromatic hydrocarbon, from the viewpoint of the shape stability of the particles in a water-based medium. The polymerizable group may be a polymerizable group capable of polycondensation reaction, or may be a polymerizable group capable of addition polymerization. According to the invention, the polymerizable group is preferably a polymerizable group capable of addition polymerization, and more preferably a group containing an ethylenically unsaturated bond, from the viewpoint of the shape stability of the particles in a water-based medium.

The aromatic group-containing monomer is preferably a monomer having an aromatic group derived from an aromatic hydrocarbon, and an ethylenically unsaturated bond. The aromatic group-containing monomer may be used singly, or two or more kinds thereof may be used in combination.

Examples of the aromatic group-containing monomer include phenoxyethyl (meth)acrylate, benzyl(meth)acrylate, phenyl(meth)acrylate, styrenic monomers and the like. Among them, from the viewpoints of the balance between hydrophilicity and hydrophobicity of the polymer chain, and ink fixability, an aromatic group-containing (meth)acrylate monomer is preferred; at least one selected from phenoxyethyl(meth)acrylate, benzyl (meth)acrylate and phenyl(meth)acrylate is more preferred; and phenoxyethyl(meth)acrylate and benzyl(meth)acrylate are even more preferred.

Here, the term "(meth)acrylate" means acrylate or methacrylate.

It is preferable that the self-dispersing polymer particles contain a constituent unit derived from an aromatic group-containing (meth)acrylate, and that the content of the constituent unit be 10% by mass to 95% by mass. When the content of the aromatic group-containing (meth)acrylate is 10% by mass to 95% by mass, the stability of the self-emulsified or dispersed state is enhanced, and an increase in the ink viscosity can be suppressed.

According to the invention, the content is more preferably 15% by mass to 90% by mass, even more preferably 15% by mass to 80% by mass, and particularly preferably 25% by mass to 70% by mass, from the viewpoints of the stability of the self-dispersed state, stabilization of the particle shape in a water-based medium as a result of hydrophobic interaction between aromatic rings or alicyclic rings, and a decrease in the amount of water-soluble components due to appropriate hydrophobization of the particles, and from the viewpoint of the washing effect.

The self-dispersing polymer particles can be constructed using, for example, a constituent unit derived from an aromatic group-containing monomer and a constituent unit derived from a dissociable group-containing monomer. Furthermore, if necessary, the polymer particles may further contain another constituent unit.

The monomer forming the other constituent unit is not particularly limited as long as it is a monomer which can be copolymerized with the aromatic group-containing monomer and the dissociable group-containing monomer. Among others, the monomer forming the other constituent unit is preferably an alkyl group-containing monomer, from the viewpoint of the flexibility of the polymer skeleton or the ease of control of the glass transition temperature (Tg).

Examples of the alkyl group-containing monomer include alkyl(meth)acrylates such as methyl(meth)acrylate, ethyl (meth)acrylate, isopropyl(meth)acrylate, n-propyl (meth) acrylate, n-butyl(meth)acrylate, isobutyl(meth)acrylate, t-butyl(meth)acrylate, hexyl (meth)acrylate and ethylhexyl (meth)acrylate; ethylenically unsaturated monomers having a hydroxyl group, such as hydroxymethyl(meth)acrylate, 2-hydroxyethyl(meth)acrylate, 2-hydroxypropyl(meth)acrylate, 4-hydroxybutyl(meth)acrylate, hydroxypentyl(meth)acrylate and hydroxyhexyl(meth)acrylate; dialkylaminoalkyl (meth)acrylates such as dimethylaminoethyl(meth)acrylate; and (meth)acrylamides, including N-hydroxyalkyl (meth) acrylamides such as N-hydroxymethyl(meth)acrylamide, N-hydroxyethyl (meth)acrylamide and N-hydroxybutyl (meth)acrylamide, and N-alkoxyalkyl (meth)acrylamides such as N-methoxymethyl(meth)acrylamide, N-ethoxymethyl (meth)acrylamide, N-(n-,iso-)butoxymethyl(meth) acrylamide, N-methoxyethyl (meth)acrylamide, N-ethoxyethyl(meth)acrylamide and N-(n-,iso-)butoxyethyl (meth) acrylamide; and the like.

The molecular weight of the water-insoluble polymer constituting the self-dispersing polymer particles is, in terms of weight average molecular weight, preferably in the range of 3000 to 200,000, more preferably in the range of 5000 to 150,000, and even more preferably in the range of 10,000 to 100,000. When the weight average molecular weight is 3000 or more, the amount of water-soluble components can be effectively suppressed, and when the weight average molecular weight is 200,000 or less, stabilization of self-dispersibility can be enhanced.

The weight average molecular weight is measured by gel permeation chromatography (GPC). The GPC measurement is carried out using HLC-8220GPC (trade name, manufactured by Tosoh Corp.), and using TSKGEL SUPER HZM-H, TSKGEL SUPER HZ4000 AND TSKGEL SUPER HZ200 columns (trade names, all manufactured by Tosoh Corp.).

The water-insoluble polymer constituting the self-dispersible polymer particles preferably contains a structural unit derived from an aromatic group-containing (meth)acrylate (preferably, a structural unit derived from phenoxyethyl (meth)acrylate and/or a structural unit derived from benzyl (meth)acrylate) at a ratio of copolymerization of 15 to 80% by mass relative to the total mass of the self-dispersing polymer particles, from the viewpoint of control of the hydrophilicity and hydrophobicity of the polymer.

Furthermore, from the viewpoint of control of the hydrophilicity and hydrophobicity of the polymer, it is preferable that the water-insoluble polymer contain a constituent unit derived from an aromatic group-containing (meth)acrylate at a ratio of copolymerization of 15 to 80% by mass, and a constituent unit derived from a carboxyl group-containing monomer and a constituent unit derived from an alkyl group-containing monomer (preferably, a structural unit derived from an alkyl ester of (meth)acrylic acid), and it is more preferable that the water-insoluble polymer contain a structural unit derived from phenoxyethyl(meth)acrylate and/or a structural unit derived from benzyl(meth)acrylate at a ratio of copolymerization of 15 to 80% by mass, and a constituent unit derived from a carboxyl group-containing monomer and a constituent unit derived from an alkyl group-containing monomer (preferably, a structural unit derived from a $C_{1-4}$ alkyl ester of (meth)acrylic acid). In addition to that, it is preferable that the water-insoluble polymer have an acid value of 25 to 100 mg KOH/g and a weight average molecular weight of 3000 to 200,000, and it is more preferable that the water-insoluble polymer have an acid value of 25 to 95 mg KOH/g and a weight average molecular weight of 5000 to 150,000.

Specific examples of the water-insoluble polymer constituting the self-dispersing polymer particles (example compounds B-01 to B-20) will be listed in the following. However, the invention is not intended to be limited to these. The numbers within the parentheses represent the mass ratios of the copolymerized components.

B-01: Phenoxyethyl acrylate/methyl methacrylate/benzyl acrylate/acrylic acid copolymer (30/50/15/5)

B-02: Phenoxyethyl acrylate/methyl methacrylate/acrylic acid copolymer (50/45/5)

B-03: Phenoxyethyl acrylate/benzyl methacrylate/isobutyl methacrylate/methacrylic acid copolymer (30/35/29/6)

B-04: Phenoxyethyl methacrylate/isobutyl methacrylate/methacrylic acid copolymer (50/44/6)

B-05: Phenoxyethyl acrylate/methyl methacrylate/ethyl acrylate/acrylic acid copolymer (30/55/10/5)

B-06: Benzyl methacrylate/isobutyl methacrylate/methacrylic acid copolymer (35/59/6)

B-07: Styrene/phenoxyethyl acrylate/methyl methacrylate/acrylic acid copolymer (10/50/35/5)

B-08: Benzyl acrylate/methyl methacrylate/acrylic acid copolymer (55/40/5)

B-09: Phenoxyethyl methacrylate/benzyl acrylate/methacrylic acid copolymer (45/47/8)

B-10: Styrene/phenoxyethyl acrylate/butyl methacrylate/acrylic acid copolymer (5/48/40/7)

B-11: Benzyl methacrylate/isobutyl methacrylate/cyclohexyl methacrylate/methacrylic acid copolymer (35/30/30/5)

B-12: Phenoxyethyl acrylate/methyl methacrylate/butyl acrylate/methacrylic acid copolymer (12/50/30/8)

B-13: Benzyl acrylate/isobutyl methacrylate/acrylic acid copolymer (93/2/5)

B-14: Styrene/phenoxyethyl methacrylate/butyl acrylate/acrylic acid copolymer (50/5/20/25)

B-15: Styrene/butyl acrylate/acrylic acid copolymer (62/35/3)

B-16: Methyl methacrylate/phenoxyethyl acrylate/acrylic acid copolymer (45/51/4)

B-17: Methyl methacrylate/phenoxyethyl acrylate/acrylic acid copolymer (45/49/6)

B-18: Methyl methacrylate/phenoxyethyl acrylate/acrylic acid copolymer (45/48/7)

B-19: Methyl methacrylate/phenoxyethyl acrylate/acrylic acid copolymer (45/47/8)

B-20: Methyl methacrylate/phenoxyethyl acrylate/acrylic acid copolymer (45/45/10)

The method for producing the water-insoluble polymer constituting the self-dispersing polymer particles according to the invention is not particularly limited, and examples include a method of performing emulsion polymerization in the presence of a polymerizable surfactant, and thereby covalently bonding the surfactant to the water-insoluble polymer; and a method of subjecting a monomer mixture including a hydrophilic group-containing monomer and the aromatic group-containing monomer to a known polymerization method such as a solution polymerization method or a bulk polymerization method. Among the polymerization methods described above, a solution polymerization method is preferred, and a solution polymerization method using an organic solvent is more preferred, from the viewpoint of the rate of aggregation and the stability of droplet jetting when the polymer is used in an ink composition.

It is preferable, from the viewpoint of the rate of aggregation, that the self-dispersing polymer particles contain a polymer synthesized in an organic solvent, that the polymer have carboxyl groups (preferably, having an acid value of 20 to 100 mg KOH/g), while having the carboxyl groups partially or entirely neutralized, and that the polymer be prepared in the form of a polymer dispersion with water as the continuous phase. That is, it is preferable to carry out the preparation of the self-dispersing polymer particles according to the invention by providing a process of synthesizing the polymer in an organic solvent, and a dispersing process of preparing a water-based dispersion in which at least a part of the carboxyl groups of the polymer have been neutralized.

The dispersing process preferably includes the following process (1) and process (2).

Process (1): stirring a mixture containing a polymer (water-insoluble polymer), an organic solvent, a neutralizing agent and a water-based medium.

Process (2): removing the organic solvent from the mixture.

The process (1) preferably involves treatments of first dissolving the polymer (water-insoluble polymer) in an organic solvent, slowly adding the neutralizing agent and the water-based medium, and mixing and stirring the components to obtain a dispersion. As such, when a neutralizing agent and a water-based medium are added to a water-insoluble polymer solution dissolved in an organic solvent, self-dispersing polymer particles having a particle size with higher storage stability can be obtained, without requiring a strong shear force.

The method of stirring the mixture is not particularly limited, and a generally used mixing-stirring apparatus, or if necessary, a dispersing machine such as an ultrasonic dispersing machine or a high pressure homogenizer can be used.

The organic solvent is preferably an alcohol-based solvent, a ketone-based solvent, or an ether-based solvent. Examples of the alcohol-based solvent include isopropyl alcohol, n-butanol, t-butanol, ethanol and the like. Examples of the ketone-based solvent include acetone, methyl ethyl ketone, diethyl ketone, methyl isobutyl ketone and the like. Examples of the ether-based solvent include dibutyl ether, dioxane and the like. Among these solvents, a ketone-based solvent such as methyl ethyl ketone, and an alcohol-based solvent such as isopropyl alcohol are preferred. Furthermore, for the purpose of making the polarity change mild at the time of phase inversion from an oil system to an aqueous system, it is also preferable to use isopropyl alcohol and methyl ethyl ketone in combination. When these solvents are used in combination, aggregation and precipitation, or fusion between particles does not occur, and self-dispersing polymer particles having a microparticle size with high dispersion stability can be obtained.

The neutralizing agent is used to neutralize a part or all of the dissociable groups of the self-dispersing polymer so that the self-dispersing polymer can form a stable emulsified or dispersed state in water. When the self-dispersing polymer has an anionically dissociating group (for example, a carboxyl group) as a dissociable group, the neutralizing agent used for this may be a basic compound such as an organic amine compound, ammonia, or a hydroxide of an alkali metal. Among them, sodium hydroxide, potassium hydroxide, triethylamine and triethanolamine are preferred from the viewpoint of stabilizing the dispersion of the self-dispersing polymer particles in water.

These basic compounds are preferably used in an amount of 5 to 120% by mole, more preferably 10 to 110% by mole, and even more preferably 15 to 100% by mole, relative to 100% by mole of the dissociable group. When the amount is set at 5% by mole or more, 10% by mole or more, or particularly 15% by mole or more, an effect of stabilizing the dispersion of the particles in water is manifested, and when the amount is set at 120% by mole or less, 110% by mole or less, and particularly 100% by mole or less, an effect of reducing water-soluble components is obtained.

In the process (2), the organic solvent is distilled off from the dispersion obtained in the process (1), through a conventional method such as distillation under reduced pressure or the like, so as to convert the phase into an aqueous system, and thereby a water-based dispersion of self-dispersing polymer particles can be obtained. The organic solvent in the obtained water-based dispersion is substantially eliminated, and the amount of the organic solvent is preferably 0.2% by mass or less, and more preferably 0.1% by mass or less.

The average particle size of the polymer particles (particularly, self-dispersing polymer particles) is, in terms of volume average particle size, preferably in the range of 10 to 400 nm, more preferably in the range of 10 to 200 nm, even more preferably in the range of 10 to 100 nm, and particularly in the range of 10 to 50 nm. When the average particle size is 10 nm or more, production suitability is enhanced. Furthermore, when the average particle size is 400 nm or less, storage stability is enhanced. The particle size distribution of the polymer particles is not particularly limited, and the polymer particles may have any of a broad particle size distribution and a monodisperse particle size distribution. It is also acceptable to use two or more kinds of water-insoluble particles in mixture.

The average particle size and the particle size distribution of polymer particles are determined by measuring the volume average particle size by a dynamic light scattering method using a NanoTrack particle size distribution analyzer (trade name: UPA-EX150, manufactured by Nikkiso Co., Ltd.).

The content of the polymer particles (particularly, self-dispersing polymer particles) in the ink composition is preferably 1 to 30% by mass, and more preferably 2 to 15% by mass, relative to the total mass of the ink composition, from the viewpoints of the scratch resistance, glossiness and the like of images. The polymer particles (particularly, self-dispersing polymer particles) can be used singly or as a mixture of two or more kinds.

(Pigment)

The ink composition according to the invention preferably contains at least one pigment. The pigment may be appropriately selected in accordance with the purpose without particular limitation, and the pigment may be an organic pigment or an inorganic pigment. The ink composition may also contain other coloring matters such as a dyestuff, in addition to the pigment, for the purpose of color adjustment or the like.

Examples of the organic pigment include an azo pigment, a polycyclic pigment, a dye chelate, a nitro pigment, a nitroso pigment, aniline black, and the like. Among these, an azo pigment, a polycyclic pigment, and the like are more preferred. Examples of the azo pigment include an azo lake, an insoluble azo pigment, a condensed azo pigment, a chelate azo pigment, and the like. Examples of the polycyclic pigment include a phthalocyanine pigment, a perylene pigment, a perinone pigment, an anthraquinone pigment, a quinacridone pigment, a dioxazine pigment, an indigo pigment, a thioindigo pigment, an isoindolinone pigment, a quinoflarone pigment, and the like. Examples of the dye chelate include a basic dye type chelate, an acidic dye type chelate, and the like.

Examples of the inorganic pigment include titanium oxide, iron oxide, calcium carbonate, barium sulfate, aluminum hydroxide, Barium Yellow, Cadmium Red, Chrome Yellow, carbon black, and the like. Among these, carbon black is particularly preferred.

Examples of the carbon black include those produced according to a known method such as a contact method, a furnace method or a thermal method. In the case of using a pigment as the coloring matter, it is preferable to use a dispersant in combination with the pigment, or to use a surface treated pigment as a pigment, in view of the dispersion stability in the ink.

The pigments described above may be used singly, or plural kinds may be selected from within the respective groups or from various groups and used in combination.

In the ink composition according to the invention, the content ratio of the pigment in the ink is preferably from 0.1% by mass to 15% by mass, more preferably from 0.5% by mass to 12% by mass, and particularly preferably from 1% by mass to 10% by mass, relative to the total mass of the ink. When the content of the pigment is within the range mentioned above, an effect of enhancing the washability of the ink is obtained. The pigment may be used singly, or two or more kinds may be used in combination.

—Polymeric Dispersant—

According to a preferred embodiment, the ink composition contains a pigment as well as a polymeric dispersant so that the ink composition contains the pigment in a state of being dispersed by a polymeric dispersant. Thereby, the pigment particles can be made to have a microparticle size, and after the pigment is dispersed, high dispersion stability is obtained. According to the invention, if the ink composition contains a polymeric dispersant, the washing effect of the maintenance liquid is prone to be decreased because of the viscosity increase, solidification and the like of the ink. Therefore, when use is made of a pigment ink containing a pigment in a state of being dispersed by a polymeric dispersant, an effect of enhancing washability is obtained.

The pigment is not necessarily needed to have the entire particle surface coated, and depending on the situation, the pigment may have at least a portion of the particle surface coated.

The resin dispersant of the pigment (hereinafter, simply referred to as dispersant) may be any of a polymeric dispersant and a low molecular weight surfactant-type dispersant. Furthermore, the polymeric dispersant may be a water-soluble dispersant or a non-water-soluble dispersant.

The low molecular weight surfactant-type dispersant can stably disperse the pigment in a water-based solvent, while maintaining the viscosity of the ink low. The low molecular weight surfactant-type dispersant is a low molecular weight dispersant having a molecular weight of 2,000 or less. The molecular weight of the low molecular weight surfactant-type dispersant is preferably 100 to 2,000, and more preferably 200 to 2,000.

The low molecular weight surfactant-type dispersant has a structure which contains a hydrophilic group and a hydrophobic group. The hydrophilic group and the hydrophobic group may be each independently included to a number of one or more in a single molecule, and the dispersant may also have plural kinds of hydrophilic groups or hydrophobic groups. The dispersant can also adequately have a linking group for linking a hydrophilic group and a hydrophobic group.

The hydrophilic group may be anionic, cationic or nonionic, or may be of betaine type combining those.

The anionic group may be any group having a negative charge, but the anionic group is preferably a phosphoric acid group, a phosphonic acid group, a phosphinic acid group, a sulfuric acid group, a sulfonic acid group, a sulfinic acid group or a carboxylic acid group; more preferably a phosphoric acid group or a carboxylic acid group; and even more preferably a carboxylic acid group. The cationic group may be any group having a positive charge, but the cationic group is preferably an organic cationic substituent, and more preferably a cationic group containing nitrogen or phosphorus. The cationic group is more preferably a pyridinium cation or an ammonium cation. The nonionic group may be a polyethylene oxide, a polyglycerin, a part of a sugar unit, or the like.

The hydrophilic group is preferably an anionic group.

When the low molecular weight surfactant-type dispersant has an anionic hydrophilic group, in the case of forming an image by accelerating an aggregation reaction through a contact with an acidic treating liquid, the pKa value of the dispersant is preferably 3 or greater, from the viewpoint of aggregatability. The pKa of a low molecular weight surfactant-type dispersant is a value experimentally determined from a titration curve, by titrating a liquid prepared by dissolving 1 mmol/L of the low molecular weight surfactant-type dispersant in a tetrahydrofuran-water (3:2=V/V) solution, with an aqueous solution of acid or alkali. If the pKa value of the low molecular weight surfactant-type dispersant is 3 or greater, on a theoretical basis, when the dispersant is contacted with a liquid at about pH 3, 50% or more of the anionic groups are brought to a non-dissociated state. Therefore, the water-solubility of the low molecular weight surfactant-type dispersant is markedly decreased, and an aggregation reaction occurs. Even from a viewpoint as such, it is preferable that the low molecular weight surfactant-type dispersant have a carboxylic acid group as the anionic group.

The hydrophobic group has a structure based on hydrocarbon, fluorocarbon, silicone or the like, and it is particularly preferable that the hydrophobic group be hydrocarbon-based. The hydrophobic group may also have a straight-chained structure or a branched structure. The hydrophobic group may also have a single-chained structure or a plural-chained structure, and in the case of a double- or more-chained structure, the dispersant may have plural kinds of hydrophobic groups.

The hydrophobic group is preferably a hydrocarbon group having 2 to 24 carbon atoms, more preferably a hydrocarbon group having 4 to 24 carbon atoms, and even more preferably a hydrocarbon group having 6 to 20 carbon atoms.

Among the polymeric dispersants, the water-soluble dispersant may be a hydrophilic macromolecular compound. Examples of naturally occurring hydrophilic macromolecular compounds include plant-derived macromolecules such as gum arabic, tragacanth gum, guar gum, karaya gum, locust bean gum, arabinogalactone, pectin and quince seed starch; seaweed-derived macromolecules such as alginic acid, carrageenan and agar; animal-derived macromolecules such as gelatin, casein, albumin and collagen; microbial-derived macromolecules such as xanthen gum and dextran; and the like.

Furthermore, examples of modified hydrophilic macromolecular compounds which have been derived from natural substances as raw materials, include cellulose-derived macromolecules such as methylcellulose, ethylcellulose, hydroxyethylcellulose, hydroxypropylcellulose and carboxymethylcellulose; starch-derived macromolecules such as sodium starch glycolate and sodium starch phosphate ester; seaweed-derived macromolecules such as sodium alginate and alginic acid propylene glycol ester; and the like.

Examples of synthetic hydrophilic macromolecular compounds include vinylic macromolecules such as polyvinyl alcohol, polyvinylpyrrolidone and polyvinyl methyl ether; acrylic resins such as non-crosslinked polyacrylamide, polyacrylic acid or alkali metal salts thereof, and water-soluble styrene-acrylic resins; water-soluble styrene-maleic acid resins, water-soluble vinylnaphthalene-acrylic resins, water-soluble vinylnaphthalene-maleic acid resins, alkali metal salts of polyvinylpyrrolidone, polyvinyl alcohol and β-naphthalenesulfonic acid-formalin condensate; macromolecular compounds having a salt of a cationic functional group such as a quaternary ammonium or amino group in a side chain; naturally occurring macromolecular compounds such as shellac; and the like.

Among these, water-soluble dispersants having carboxyl groups introduced therein, such as homopolymers of acrylic acid, methacrylic acid or styrene-acrylic acid, and copolymers thereof with monomers having other hydrophilic groups, are preferred as the hydrophilic macromolecular compound.

Among the polymeric dispersants, as the non-water-soluble dispersant that can be used a polymer having both a hydrophobic moiety and a hydrophilic moiety can be used. Examples thereof include a styrene-(meth)acrylic acid copolymer, a styrene-(meth)acrylic acid-(meth)acrylic acid ester copolymer, a (meth)acrylic acid ester-(meth)acrylic acid copolymer, a polyethylene glycol (meth)acrylate-(meth)acrylic acid copolymer, a vinyl acetate-maleic acid copolymer, a styrene-maleic acid copolymer, and the like.

The weight average molecular weight of the polymeric dispersant is preferably 3,000 to 100,000, more preferably 5,000 to 50,000, even more preferably 5,000 to 40,000, and particularly preferably 10,000 to 40,000.

In the case of forming an image by contacting the self-dispersing polymer particles with an acidic treating liquid and thereby accelerating an aggregation reaction, the acid value of the polymeric dispersant is preferably 100 mg KOH/g or less from the viewpoint of aggregatability of the polymer particles. The acid value is more preferably 25 to 100 mg KOH/g, even more preferably 25 to 80 mg KOH/g, and particularly preferably 30 to 65 mg KOH/g. When the acid value of the polymeric dispersant is 25 or greater, the stability of the self-dispersing polymer particles becomes satisfactory.

In the case of forming an image by contacting the self-dispersing polymer particles and an acidic treating liquid and thereby accelerating an aggregation reaction, it is preferable that the polymeric dispersant contain a polymer having a carboxyl group, and it is more preferable that the polymeric dispersant contain a polymer having a carboxyl group and having an acid value of 25 to 80 mg KOH/g, from the viewpoint of the rate of aggregation.

The mixing ratio by mass of the pigment (p) and the dispersant (s) (p:s) is preferably in the range of 1:0.06 to 1:3, more preferably 1:0.125 to 1:2, and even more preferably 1:0.125 to 1:1.5.

According to the invention, the ink composition preferably contains a pigment and a dispersant, more preferably contains an organic pigment and a polymeric dispersant, and particularly preferably contains an organic pigment and a polymeric dispersant containing a carboxyl group, from the viewpoints of the light-fastness or quality of images, as well as the solubility or redispersibility of a thickened or solidified matter of the ink. Furthermore, it is preferable that the pigment contained as a coloring matter be a water-insoluble, water-dispersible pigment coated on a polymeric dispersant having a carboxyl group, from the viewpoint of the solubility or redispersibility of a thickened or solidified matter of the ink.

The average particle size of the pigment is preferably 10 to 200 nm, more preferably 10 to 150 nm, and even more preferably 10 to 100 nm. When the average particle size is 200 nm or less, color reproducibility is satisfactory, and the droplet jetting properties upon jetting droplets by an inkjet method are satisfactory. When the average particle size is 10 nm or greater, light-fastness becomes satisfactory. The particle size distribution of the coloring matter is not particularly limited, and any of a broad particle size distribution or a monodisperse particle size distribution is acceptable. A mixture of two or more kinds of coloring matters each having a monodisperse particle size distribution may also be used.

The average particle size and the particle size distribution of the polymer particles are determined by measuring the volume average particle size by a dynamic light scattering method using a NanoTrack particle size distribution analyzer (trade name: UPA-EX150, manufactured by Nikkiso Co., Ltd.).

—Ratio of Pigment and Polymeric Dispersant—

The ratio of the pigment and the polymeric dispersant by mass is preferably 100:25 to 100:140, and more preferably 100:25 to 100:50. When the ratio of the polymeric dispersant is 100:25 or greater, dispersion stability and scratch resistance tend to be ameliorated, and when the ratio is 100:140 or less, dispersion stability tends to be ameliorated.

(Water)

The ink composition according to the invention is a water-based composition and contains water. The content of water in the ink composition is preferably from 10% by mass to 99% by mass, more preferably from 30% by mass to 80% by mass, and even more preferably from 50% by mass to 70% by mass, in view of securing stability and jetting reliability.

(Volatile Water-Soluble Organic Solvent)

The ink composition according to the invention contains at least one volatile water-soluble organic solvent, so that the polymer particles can deposit on a recording medium at the time of forming an image and thereby increase the adhesiveness to the recording medium. In the ink composition containing a volatile water-soluble organic solvent, the organic solvent is prone to vaporize at the time of image formation, and a film is prone to form on the nozzle surface of the nozzle plate which has undergone a temperature increase to a predetermined temperature as a result of the volatilization of the organic solvent upon image formation.

According to the invention, the term "volatile" means that the vapor pressure at 20° C. is 1 Pa or greater.

The organic solvent according to the invention is not particularly limited, but in view of volatility, an organic solvent having a low boiling point is preferred, and an organic solvent having a boiling point of 285° C. or lower is more preferred. An even more preferred organic solvent has a boiling point of 250° C. or lower, or 200 to 250° C. When an organic solvent having a boiling point in this range is used, it is preferable that the temperature of the nozzle plate that ejects ink be 40 to 70° C.

Preferred specific examples of the organic solvent that can be contained in the ink composition will be listed in the following. However, the invention is not intended to be limited to these.

TABLE 1

| Solvent species | Boiling point [° C.] |
| --- | --- |
| Ethylene glycol | 196 |
| Diethylene glycol | 245 |
| Propylene glycol | 188 |
| Dipropylene glycol | 245 |
| 2-Pyrrolidinone | 245 |
| N-methylpyrrolidone | 202 |
| 1,3-Propanediol | 214 |

TABLE 1-continued

| Solvent species | Boiling point [° C.] |
| --- | --- |
| 1,2-Butanediol | 194 |
| 1,3-Butanediol | 203 |
| 1,4-Butanediol | 230 |
| 2,3-Butanediol | 183 |
| 2,2-Dimethyl-1,3-propanediol | 210 |
| 2-Methyl-1,3-propanediol | 213 |
| 1,2-Pentanediol | 206 |
| 1,5-Pentanediol | 242 |
| 2,4-Pentanediol | 201 |
| 1,2-Hexanediol | 223 |
| 3,5-Dimethyl-3-hexyne-2,5-diol | 205 |
| 2,5-Hexanediol | 221 |
| 2-Methyl-2,4-pentanediol (hexylene glycol) | 198 |
| 1,6-Hexanediol | 250 |
| 2-Ethyl-1,3-hexanediol | 242 |
| 2,2,4-Trimethyl-1,3-pentanediol (TMPD glycol) | 215-235 |
| 2,5-Dimethyl-2,5-hexanediol | 214 |
| Sulfolane | 285 |

TABLE 2

| Solvent species | Boiling point [° C.] |
| --- | --- |
| 1,4-Cyclohexanedimethanol | 285 |
| 2,2-Thiodiethanol | 282 |
| 3-Pyridylcarbinol | 286 |
| Propylene glycol monomethyl ether | 120 |
| Dipropylene glycol methyl ether | 190 |
| Tripropylene glycol methyl ether | 243 |
| Propylene glycol ethyl ether | 133 |
| Propylene glycol n-propyl ether | 149 |
| Dipropylene glycol n-propyl ether | 213 |
| Tripropylene glycol n-propyl ether | 251 |
| Propylene glycol n-butyl ether | 171 |
| Dipropylene glycol n-butyl ether | 230 |
| Tripropylene glycol n-butyl ether | 274 |
| Propylene glycol t-butyl ether | 153 |
| Dipropylene glycol t-butyl ether | 212 |
| Propylene glycol phenyl ether | 243 |
| Ethylene glycol methyl ether | 125 |
| Diethylene glycol methyl ether | 194 |
| Triethylene glycol methyl ether | 249 |
| Ethylene glycol ethyl ether | 135 |
| Diethylene glycol ethyl ether | 202 |
| Tridiethylene glycol ethyl ether | 256 |
| Ethylene glycol n-propyl ether | 150 |
| Ethylene glycol n-butyl ether | 171 |
| Diethylene glycol n-butyl ether | 230 |
| Triethylene glycol n-butyl ether | 280 |
| Ethylene glycol n-hexyl ether | 208 |
| Diethylene glycol n-hexyl ether | 259 |
| Ethylene glycol phenyl ether | 244 |

The solvent may be used singly, or two or more kinds may be used in mixture.

The content ratio of the solvent in the ink composition is not particularly limited, and the content ratio is preferably 5% by mass to 50% by mass, more preferably 10% by mass to 40% by mass, and particularly preferably 15% by mass to 35% by mass, relative to the total mass of the ink composition. When the content of the organic solvent is 5% by mass or more, stability and jetting reliability of the ink are secured, and when the content is 50% by mass or less, it is advantageous in view of jetting reliability.

(Other Components)

The ink composition of the invention can be constituted by further using the following other components in addition to the components described above. Examples of the other components that can be contained in the ink composition include known additives such as a surfactant, a water-soluble organic solvent, a buffer, a biocide, a metal ion sequestering agent, an ultraviolet absorbent, a discoloring preventing agent, an antifungal agent, a pH adjusting agent, an anti-rust agent, an antioxidant, an emulsion stabilizer, an antiseptic, a defoaming agent, a viscosity adjusting agent, a dispersion stabilizer, and a chelating agent. Furthermore, the ink composition may also contain the additives described in paragraph [0033] of JP-A No. 2005-220352.

In addition to the volatile water-soluble organic solvent mentioned above, common type of water-soluble organic solvents, including an aliphatic alcohol, an aromatic alcohol, a diol, a glycol ether, a polyglycol ether, caprolactam, formamide, acetamide and a long-chain alcohol, can be used as another solvent. Examples of such a compound include relatively higher homologues of a primary aliphatic alcohol, a secondary aliphatic alcohol, a 1,2-alcohol, a 1,3-alcohol, a 1,5-alcohol, an ethylene glycol alkyl ether, a propylene glycol alkyl ether and a polyethylene glycol alkyl ether; an N-alkylcaprolactam, unsubstituted caprolactam, substituted and unsubstituted formamide, substituted and unsubstituted acetamide, and the like. When the volatile water-soluble organic solvent is present in a larger amount, for example, in an amount of more than 7% by mass, a larger amount of a non-volatile water-soluble organic solvent may be present.

The ink composition can contain at least one surfactant as a surface tension adjusting agent. Examples of the surfactant include alkyl polyethylene oxide, alkyl phenyl polyethylene oxide, a polyethylene oxide block copolymer, acetylene polyethylene oxide, polyethylene oxide (di)ester, polyethylene oxide amine, protonated polyethylene oxide amine, protonated polyethylene oxide amide, a dimethicone copolymer, fluoroalkyl polyethylene oxide, substituted amine oxide, and the like. In the case of adding a surfactant, the amount of addition of the surfactant is preferably 0.01 to 10% by weight.

In regard to the water-soluble organic solvent and surfactant that can be contained, for example, another water-soluble organic solvent functioning as a moisturizing agent, a wetting agent and/or a surfactant, such as an aliphatic hydrocarbon having 5 to 22 carbon atoms, a silicone, a fluorocarbon and a surfactant, can be contained in the ink composition. These components can be used to wet a medium having a low surface energy.

Specific examples of the surfactant include the same surfactants as those that can be used in the maintenance liquid which will be described later. Inter alia, from the viewpoint of avoiding the interference in droplet jetting of deposited ink, a nonionic surfactant is preferred, and an acetylene diol derivative among others is particularly preferred.

Furthermore, a metal ion sequestering agent such as EDTA (ethylenediamine tetraacetate) can be used to eliminate any harmful action of heavy metal impurities, and a buffer solution can be used to control the pH of the ink. The details on these are described in paragraph [0033] of JP-A No. 2005-220352.

—Properties of Ink Composition—

The surface tension of the ink composition is preferably in the range of from 20 mN/m to 60 mN/m, more preferably in the range of from 20 mN/m to 45 mN/m, and even more preferably in the range of from 25 mN/m to 40 mN/m, from the viewpoint of jetting stability obtainable when the ink composition is used in inkjet recording. The surface tension is measured using an automatic surface tensiometer (trade name: CBVP-Z, manufactured by Kyowa Interface Science Co., Ltd.), by adjusting the temperature of the ink composition to 25° C.

The viscosity of the ink composition at 20° C. is preferably in the range of from 1.2 mPa·s to 15.0 mPa·s, more preferably in the range of from 2 mPa·s to less than 13 mPa·s, and even more preferably in the range of from 2.5 mPa·s to less than 10 mPa·s. The viscosity is value measure using a viscometer (trade name: TV-22, manufactured by Toki Sangyo Co., Ltd.) after adjusting ink composition to 20° C.

The ink set of the invention is used in inkjet recording, and specifically, the ink set is used in the case of applying energy to an ink for inkjet recording and thereby recording an image on a known image-receiving material (for example, ordinary paper, resin-coated paper, paper exclusive for inkjet recording, film, paper for shared use in electrophotography, cloth, glass, metal, porcelain, or the like).

—Maintenance Liquid Applying Process—

The maintenance liquid applying process involves applying a maintenance liquid on the nozzle surface of the nozzle plate after jetting is carried out in the previous ink jetting process.

According to the image forming method of the invention, in an embodiment in which images are recorded using an ink composition containing polymer particles (resin particles) and a pigment (preferably, a water-dispersible pigment having at least a part of the pigment surface coated with a polymeric dispersant and being dispersed), at least a part of the inkjet head which ejects an ink composition is washed using a maintenance liquid. When the maintenance liquid is applied at a predetermined time point after ink jetting, the head that ejects ink and its jetting performance can be repaired and maintained, so that an anticipated state or a state close thereto can be preserved and sustained.

For the maintenance achieved by using a maintenance liquid, any method may be selected as long as it is a method capable of applying the maintenance liquid on a desired part and removing any ink that is adhered thereto by sticking or the like, from the viewpoint of preventing the adhesive fouling, clogging or the like of the ink. For example, the maintenance can be carried out by a method of applying the maintenance liquid on the nozzle surface of the recording head of an inkjet recording apparatus, and then wiping the nozzle surface.

At this time, the application of the maintenance liquid can be carried out by, for example, roll coating, spraying or the like. Furthermore, in the removing process of removing an ink that has stuck (stuck ink), a method of scraping off the stuck ink by scrubbing the nozzle surface (wiping) using a wiper blade after the maintenance liquid has been applied; a method of removing the stuck ink by using air-blow pressure, liquid pressure of the maintenance liquid, or the like; and a method of wiping off the stuck ink with cloth or paper, are preferred. Among them, a method of scraping off with a blade and a method of wiping off with cloth or paper are preferred. The amount of the maintenance liquid, temperature and the like at the time of applying the maintenance liquid can be appropriately selected in accordance with the liquid composition, type of the ink, amount of adherence or the like.

In the image forming method of the invention, it is preferable to use a pigment ink as the ink composition to be applied to an inkjet recording apparatus that forms images. In the case of following an inkjet method, for example, since recording is carried out by jetting the ink from nozzles having a microscopic diameter of about 20 to 50 µm, vaporization of solvent or water, separation of coloring matter, thickening of the ink due to aggregation or the like, and generation of precipitates are likely to occur in the vicinity of the nozzle area, and there may occur inconveniences such as disturbance in the images and clogging of nozzles. Such inconveniences are prone to occur during the resting period of the apparatus, which may take a long time, but the inconveniences are particularly prone to occur when the nozzle plate is in a heated state.

The maintenance liquid can be suitably used in the case of washing the apparatus before resting after a long-term use, or washing the apparatus before its operation after a long-term resting, as a method for solving inconveniences such as thickening, solidification or the like as a result of drying of the ink.

The maintenance liquid according to the invention preferably contains, for example, water such as ultrapure water or ion-exchanged water, and more preferably contains water and an organic solvent. The maintenance liquid can be constituted by further using other components such as a surfactant, according to necessity.

The reason for how such inconveniences as described above can be effectively suppressed and solved is not clear, but for example, the reason is speculated as follows.

When the maintenance liquid contains an organic solvent, this organic solvent works as a dissolving agent or softening agent against the polymer particles in the ink, and has an excellent effect of rapidly penetrating into the thickened or solidified matter generated as a result of drying of the ink, thereby softening, redispersing or dissolving the thickened or solidified matter, and rapidly dissolving or redispersing the solids in the maintenance liquid (polymer particles, pigment and the like). It is believed that when the dried-up ink adhering to the nozzles or the like (solids) is dissolved or redispersed, clumps of the dried-up ink are resolved and become easily removable from the nozzle surface of the head.

(Organic Solvent)

Examples of the organic solvent include an ether-based solvent, an alcohol-based solvent and the like.

The ether-based solvent can be selected without particular limitation, and examples include diethyl ether, dibutyl ether, ethyl methyl ether, dihexyl ether, furan, diethylene glycol monoethyl ether, diethylene glycol monobutyl ether, triethylene glycol monoethyl ether, triethylene glycol monobutyl ether, propylene glycol monobutyl ether, dipropylene glycol monobutyl ether, dipropylene glycol t-butyl ether, diethylene glycol monohexyl ether, ethylene glycol mono-2-ethylhexyl ether, and diethylene glycol mono-2-ethylhexyl ether.

Furthermore, the alcohol-based solvent can be selected from straight-chained or branched alcohols having 4 or more carbon atoms without particularly limitation, and examples include butanol, pentanol, hexanol, octanol and the like. Among them, the alcohol-based solvent is preferably a non-cyclic, straight-chained or branched alcohol having 4 or more carbon atoms.

Among those mentioned above, the organic solvent is preferably selected from the ether-based solvents mentioned above, from the viewpoint of dissolubility or redispersibility of the thickened or solidified matter of the ink.

Among the ether-based solvents, an ether-based solvent having both of one hydroxyl group and one or more ether bonds is more preferred from the viewpoint of the dissolubility or redispersibility of the thickened or solidified matter of the ink, and jettability of the ink. Examples of such an ether-based solvent include diethylene glycol monoethyl ether, diethylene glycol monobutyl ether; a (mono- or di-)propylene alkyl ether such as propylene glycol monobutyl ether, dipropylene glycol monobutyl ether and dipropylene glycol t-butyl ether; and a (mono- or di-)ethylene alkyl ether such as diethylene glycol monohexyl ether, ethylene glycol mono-2-ethylhexyl ether and diethylene glycol mono-2-ethylhexyl ether.

The content of the organic solvent contained in the maintenance liquid is preferably in the range of 5% by mass or more relative to the total mass of the maintenance liquid. Inter alia, the content of the organic solvent is more preferably in the range of 5 to 50% by mass, even more preferably 8 to 25% by mass, and particularly preferably 8 to 15% by mass. When the content of the organic solvent is 5% by mass or more, the effects described above, that is, the dissolubility or redispersibility of the thickened or solidified matter of the ink, as well as the washing performance and recovery performance, are exhibited so that the inkjet head and its jetting performance can be stably maintained in an anticipated state or a state close thereto for a long time.

(Water)

The maintenance liquid contains water. Preferred water is intended to have ionic impurities reduced as much as possible, and thus use can be made of pure water or ultrapure water such as ion-exchanged water, ultrafiltered water, reverse osmosis water or distilled water.

The maintenance liquid preferably has a composition containing water as a major component in view of safety, general-purpose usability, ease of handling and the like, and the proportion of water in the composition containing water as a major component of the solvent is preferably in the range of 50 to 92% by mass, and more preferably in the range of 75 to 92% by mass, relative to the total mass of the maintenance liquid.

(Surfactant)

The maintenance liquid can contain a surfactant. The surfactant is not particularly limited, but from the viewpoint of not causing any aggregation reaction with the ink, an anionic surfactant or a nonionic surfactant is preferably used.

Specific examples of the anionic surfactant include sodium methyltaurin oleate, sodium dodecyl sulfate, sodium dodecyl benzenesulfonate, sodium lauryl sulfate, sodium alkyl diphenyl ether disulfonate, sodium alkyl naphthalenesulfonate, sodium dialkyl sulfosuccinate, sodium stearate, potassium oleate, sodium dioctyl sulfosuccinate, sodium polyoxyethylene alkyl ether sulfate, sodium polyoxyethylene alkyl ether sulfate, sodium polyoxyethylene alkyl phenyl ether sulfate, sodium dialkyl sulfosuccinate, sodium stearate, sodium oleate, salt of sodium t-octylphenoxy ethoxy polyethoxyethyl sulfate, and the like. Specific examples of the nonionic surfactant include acetylene diol derivatives such as an ethylene oxide adduct of acetylene diol, polyoxyethylene lauryl ether, polyoxyethylene octyl phenyl ether, polyoxyethylene oleyl phenyl ether, polyoxyethylene nonyl phenyl ether, oxyethylene-oxypropylene block copolymers, t-octylphenylethyl polyethoxyethanol, nonylphenoxyethyl polyethoxyethanol, and the like.

Among those mentioned above, the surfactant is preferably an anionic surfactant, and more preferably sodium alkylcarboxylate or sodium alkylsulfonate. In this case, it is particularly preferable that the carbon number of the alkyl moiety be in the range of 10 to 20.

The content of the surfactant in the maintenance liquid is not particularly limited, but from the viewpoint of washability, the content is preferably 0.1% by mass or greater, and more preferably 0.5 to 10% by mass.

It is preferable for the maintenance liquid to have a smaller amount of a moisturizing agent in order to avoid the curling of the recording medium after recording as a result of incorporation of the moisturizing agent into the ink upon maintenance. The content of the moisturizing agent is preferably 1% by mass or less relative to the total mass of the maintenance liquid, and it is particularly preferable that the maintenance liquid do not contain any moisturizing agent.

The moisturizing agent means a less volatile water-soluble compound having a relatively high moisturizing capability, and specific examples include polyols (for example, glycerin, ethylene glycol, diethylene glycol, triethylene glycol, tetraethylene glycol, polyethylene glycol, propylene glycol, dipropylene glycol, polypropylene glycol, 1,3-propanediol, 1,4-butanediol, 1,5-pentanediol, pentaerythritol and the like), lactams (for example, 2-pyrrolidone, N-methyl-2-pyrrolidone, and the like), and the like; and water-soluble solid moisturizing agents (for example, diols such as 1,6-hexanediol, 1,8-octanediol, 2,2-dimethyl-1,3-propanediol and 2,2-diethyl-1,3-propanediol; trimethylolethane, trimethylolpropane and the like; monosaccharides, disaccharides, oligosaccharides and polysaccharides such as glucose, mannose, fructose, ribose, xylose, arabinose, galactose, aldonic acid, glucitol (sorbitol), maltose, cellobiose, lactose, sucrose, trehalose and maltotriose; reducing sugars and oxidizing sugars of these saccharides, amino acids and derivatives such as thiosugars), and the like.

—Properties of Maintenance Liquid—

The maintenance liquid is preferably a liquid that does not cause aggregation when mixed with a water-based ink composition. It is because if the maintenance liquid causes aggregation, components such as pigment in the ink composition further stick to the inkjet head and the like, thereby lowering the effects of the invention.

The pH of the maintenance liquid is not particularly limited, but from the viewpoint of anti-rusting of the inkjet recording apparatus or preventing deterioration of the liquid-repellent film of the head, the pH is preferably in the range of 6 to 10 at 25° C., and is more preferably in the range of 7 to 9 at 25° C. The pH is a value measured using a pH meter (trade name: WM-50EG, manufactured by DKK-Toa Corp.) after adjusting the liquid to 25° C.

In order to adjust the pH of the maintenance liquid to the range mentioned above, a pH adjusting agent such as a water-soluble basic substance can be used as necessary. Specific examples of the water-soluble basic substance include alcohol amines (for example, diethanolamine, triethanolamine, 2-amino-2-ethyl-1,3-propanediol, and the like), alkali metal hydroxides (for example, lithium hydroxide, sodium hydroxide, potassium hydroxide and the like), ammonium hydroxides (for example, ammonium hydroxide, quaternary ammonium hydroxide), phosphonium hydroxides, alkali metal carbonates, and the like.

The viscosity of the maintenance liquid at 25° C. is preferably from 1 mPa·s to 1000 mPa·s, more preferably from 1 mPa·s to less than 500 mPa·s, and even more preferably from 2 mPa·s to less than 100 mPa·s, from the viewpoint of workability. The viscosity is a value measured using a viscometer (trade name: TV-22, manufactured by Toki Sangyo Co., Ltd.) under the conditions at 25° C.

The maintenance liquid according to the invention may be colored by containing a coloring matter such as pigment. However, in view of avoiding the fear of damaging the color of the ink (that is, the ink image), the content of the coloring matter such as pigment is preferably 1% by mass or less relative to the total mass of the maintenance liquid, and it is particularly preferable that the maintenance liquid be a colorless liquid that does not contain a pigment.

The maintenance liquid is preferably applied in an inkjet recording apparatus making use of a pigment ink as an ink for image recording and used in the maintenance of jetting nozzles of an inkjet recording apparatus equipped with jetting nozzles that eject a pigment ink. As explained above, since the maintenance liquid has excellent washability, the maintenance liquid is suitable for inkjet recording apparatuses making use of pigment inks, which are more extensively used in recent years.

The following is a list of exemplary embodiments of the invention.

<1> There is provided an image forming method comprising jetting an ink composition containing a pigment, a volatile water-soluble organic solvent, polymer particles and water, from a heated nozzle plate of an inkjet head onto a recording medium; and applying a maintenance liquid on a nozzle surface of the nozzle plate after jetting.

<2> There is provided an image forming method as described in the item <1>, wherein a temperature of the nozzle plate is equal to or greater than a temperature at which the ink spreads into a film when heated.

<3> There is provided an image forming method as described in the item <2>, wherein the temperature of the nozzle plate is 30° C. or higher.

<4> There is provided an image forming method as described in any one of the items <1> to <3>, wherein a boiling point of the water-soluble organic solvent is 285° C. or lower.

<5> There is provided an image forming method as described in any one of the items <1> to <4>, wherein the pigment is a water-dispersible pigment having at least a part of a surface thereof coated with a polymeric dispersant.

<6> There is provided an image forming method as described in any one of the items <1> to <5>, wherein the polymer particles are self-dispersing polymer particles.

<7> There is provided an image forming method as described in the item <6>, wherein the self-dispersing polymer particles have a carboxyl group.

<8> There is provided an image forming method as described in any one of the items <1> to <7>, wherein the maintenance liquid contains at least water.

<9> There is provided an image forming method as described in any one of the items <1> to <8>, wherein the maintenance liquid contains an organic solvent in an amount of 5% by mass to 50% by mass relative to a total liquid amount of the maintenance liquid.

<10> There is provided an image forming method as described in the item <9>, wherein the organic solvent contained in the maintenance liquid is at least one selected from the group consisting of an alcohol-based solvent and an ether-based solvent.

<11> The image forming method as described in any one of the items <1> to <10>, further comprising wiping the nozzle surface after applying the maintenance liquid on the nozzle surface.

EXAMPLES

Hereinafter, the invention will be more specifically described by way of Examples, but the invention is not intended to be limited to the following Examples as long as the invention does not depart from the gist. Unless particularly stated otherwise, the unit "part" is on a mass basis.

The weight average molecular weight was measured by gel permeation chromatography (GPC). GPC was carried out using HLC-8020GPC (trade name, manufactured by Tosoh Corp.) and using three columns of TSKGEL SUPER HZM-H, TSKGEL SUPER HZ4000 AND TSKGEL SUPER HZ200 (trade names, all manufactured by Tosoh Corp.) connected in series, and tetrahydrofuran (THF) as an eluent. Measurement was carried out using an IR detector under the conditions of a sample concentration of 0.45% by mass, a flow rate of 0.35 ml/min, a sample jetting amount of 10 μl and a measurement temperature of 40° C. A calibration curve was produced based on eight samples of "Standard Sample TSK Standard, polystyrene": "F-40", "F-20", "F-4", "F-1", "A-5000", "A-2500", "A-1000" and "n-propylbenzene" manufactured by Tosoh Corp.

Examples 1 to 7 and Comparative Examples 1 to 2

(1) Preparation of Maintenance Liquid

Maintenance liquids having the compositions shown in the following Table 4 were prepared. Preparation of each of the maintenance liquids was carried out by mixing the various components and sufficiently stirring the mixture.

(2) Preparation of Water-Based Ink

<Preparation of Self-Dispersing Polymer B-01>
360.0 g of methyl ethyl ketone was introduced into a 2-liter three-necked flask equipped with a stirrer, a thermometer, a reflux cooling tube and a nitrogen gas inlet tube, and the temperature was increased to 75° C. While the temperature inside the reaction vessel was maintained at 75° C., a mixed solution containing 180.0 g of phenoxyethyl acrylate, 162.0 g of methyl methacrylate, 18.0 g of acrylic acid, 72 g of methyl ethyl ketone and 1.44 g of "V-601" (trade name, manufactured by Wako Pure Chemical Industries, Ltd.) was added dropwise at a constant rate so that dropwise addition would be completed in two hours. After completion of the dropwise addition, a solution containing 0.72 g of "V-601" and 36.0 g of methyl ethyl ketone was added thereto, and the mixture was stirred for 2 hours at 75° C. Subsequently, a solution containing 0.72 g of "V-601" and 36.0 g of isopropanol was further added thereto, and the resulting mixture was stirred for 2 hours at 75° C. The temperature of the reaction mixture was increased to 85° C., and stirring was continued for another 2 hours. Thus, a polymer solution was obtained.

The weight average molecular weigh (Mw) of the obtained copolymer was 64000 (calculated by gel permeation chromatography (GPC) relative to polystyrene standards), and the acid value was 38.9 (mg KOH/g).

Subsequently, 668.3 g of the polymer solution was weighed, and 388.3 g of isopropanol and 145.7 ml of 1 mol/L aqueous solution of NaOH were added thereto. The temperature inside the reaction vessel was increased to 80° C. Subsequently, 720.1 g of distilled water was added dropwise at a rate of 20 ml/min to form an aqueous dispersion. Thereafter, the temperature inside the reaction vessel was maintained at 80° C. for 2 hours, at 85° C. for 2 hours, and at 90° C. for 2 hours at atmospheric pressure, and then the pressure inside the reaction vessel was reduced to distill off isopropanol, methyl ethyl ketone and distilled water to an amount of 913.7 g in total. Thus, an aqueous dispersion (emulsion) of self-dispersing polymer particles B-01 [phenoxyethyl acrylate/methyl methacrylate/acrylic acid copolymer (=50/45/5 [mass ratio])] at a solids concentration of 28.0% was obtained.

<Preparation of Cyan Pigment Dispersion C1>
—Synthesis of Water-Soluble Polymeric Dispersant—
A mixed solution of 6 parts of styrene, 11 parts of stearyl methacrylate, 4 parts of a styrene macromer (trade name: AS-6, manufactured by Toagosei Co., Ltd.), 5 parts of PREN-MER PP-500 (trade name, manufactured by Nippon Oil & Fat Co., Ltd.), 5 parts of methacrylic acid, 0.05 parts of 2-mercaptoethanol, and 24 parts of methyl ethyl ketone was prepared in a reaction vessel.

Meanwhile, a mixed solution of 14 parts of styrene, 24 parts of stearyl methacrylate, 9 parts of a styrene macromer (trade name: AS-6, manufactured by Toagosei Co., Ltd.), 9 parts of PRENMER P-500 (trade name, manufactured by Nippon Oil & Fat Co., Ltd.), 10 parts of methacrylic acid, 0.13 parts of 2-mercaptoethanol, 56 parts of methyl ethyl ketone and 1.2 parts of 2,2'-azobis(2,4-dimethylvaleronitrile) was prepared and placed in a dropping funnel.

Subsequently, the mixed solution in the reaction vessel was heated to 75° C. under a nitrogen atmosphere while the solution was stirred, and the mixed solution in the dropping funnel was slowly added dropwise thereto over one hour. After a lapse of 2 hours from the time point of completion of the dropwise addition, a solution prepared by dissolving 1.2 parts of 2,2'-azobis(2,4-dimethylvaleronitrile) in 12 parts of methyl ethyl ketone was added dropwise over 3 hours, and the resulting mixture was aged for 2 hours at 75° C. and for 2 hours at 80° C. Thus, a methyl ethyl ketone solution of a water-insoluble polymeric dispersant was obtained.

For a portion of the obtained solution of the water-insoluble polymeric dispersant, the solid fraction isolated and obtained by removing the solvent was diluted with tetrahydrofuran to 0.1% by mass, and the weight average molecular weight was measured by GPC. As a result, the isolated solid fraction had a weight average molecular weight of 25,000 as calculated relative to polystyrene standards.

—Preparation of Cyan Pigment Dispersion Liquid—

5.0 g (in terms of the solid fraction) of methyl ethyl ketone solution of the obtained water-insoluble polymeric dispersant, 10.0 g of Pigment Blue 15:3 (cyan pigment, manufactured by Daiichi Seiko Co., Ltd.), 40.0 g of methyl ethyl ketone, 8.0 g of 1 mol/L sodium hydroxide, and 82.0 g of ion-exchanged water were supplied to a vessel together with 300 g of 0.1-mm zirconia beads, and the mixture was dispersed for 6 hours at 1000 rpm with a READY Mill dispersing machine (trade name, manufactured by Aimex Co., Ltd.). The obtained dispersion liquid was concentrated under reduced pressure using an evaporator, until methyl ethyl ketone was sufficiently distilled off. The pigment concentration was adjusted to 10% by mass, and thus a cyan pigment dispersion liquid C1 was obtained as a dispersion liquid of colored particles which were formed from a pigment having its surface coated with a water-insoluble polymeric dispersant. The obtained cyan pigment dispersion liquid C1 had an average particle size of 77 nm.

<Preparation of Cyan Inks 1 and 2>

The cyan pigment dispersion liquid C1; a water-based dispersion of the self-dispersing polymer particles B-01; an aqueous medium containing ultrapure water, 1,2-hexanediol, N-methylpyrrolidone and diethylene glycol; and a surfactant were used to prepare cyan inks each having an ink composition as indicated in the following Table 3. After the liquids were prepared, coarse particles were removed using a 5-μm membrane filter, and thus cyan inks 1 and 2 were obtained as water-based ink compositions.

TABLE 3

|  |  | Cyan ink 1 | Cyan ink 2 |
| --- | --- | --- | --- |
| Organic solvent | 1,2-Hexanediol (boiling point: 223° C.) | 6 | 10 |
|  | N-methylpyrrolidone (boiling point: 245° C.) | 6 | — |
|  | Diethylene glycol (boiling point: 245° C.) | 10 | 10 |
| Surfactant | Zonyl FSO | 2 | — |
|  | Orfin E1010 | — | 1 |
| Cyan pigment dispersion liquid C1 |  | 2 | 2 |
| Latex (self-dispersing polymer B-01) |  | 4 | 4 |
| Ultrapure water |  | 70 | 73 |

[Unit: parts]

The details of the components indicated in the Table 3 are as follows.

ZONYL FSO (trade name, manufactured by DuPont Company)

ORFIN E1010 (trade name, manufactured by Nisshin Chemical Co., Ltd.; nonionic surfactant)

It was confirmed that the cyan inks 1 and 2 spread into films when added dropwise on a hot plate which had been warmed to 40° C.

(3) Image Formation and Evaluation of Maintenance Properties

An inkjet recording apparatus [trade name: DIMATIX MATERIAL PRINTER DMP-2831, manufactured by Fujifilm Dimatix, Inc. (equipped with a 10 pl jetting cartridge (trade name: DMC-11610) which had been modified to allow liquid supply from an external source)] was loaded with the cyan ink 1 or cyan ink 2 together with each of the maintenance liquids in sequence. An image was formed by jetting the cyan ink under the following conditions (1) to (3). After jetting of the ink, the image was heated by exposing the image to dry air from a dryer. At this time, the temperature of the nozzle plate (nozzle surface) of the inkjet head was elevated to 40° C. After the image was formed and left for 30 seconds, the maintenance liquid was applied on the nozzle surface of the inkjet head using a roller, and then the nozzle surface of the inkjet head was wiped out with a cloth wipe (trade name: TORAY-SEE, manufactured by Toray Industries, Inc.).

Success or failure was judged from a re-jettability evaluation performed thereafter, and the maintenance properties were evaluated according to the following evaluation criteria. The evaluation results are presented in Table 4 below.

—Conditions for Evaluation of Re-Jettability—

(1) If the ink is continuously jetted for 45 minutes, cloth wiping is carried out once immediately after completion of the jetting, and then the ink jetting ratio of all nozzles is 90% or higher, it is judged as acceptable.

(2) If the ink is jetted for one minute and rested for 30 minutes, cloth wiping is performed once after the resting, and then the ink jetting ratio of all nozzles is 90% or higher, it is judged as acceptable.

(3) If the ink is jetted for 15 minutes, cloth wiping is carried out once immediately after completion of the jetting, but image unevenness is not seen in the images recorded thereafter, it is judged as acceptable.

—Method for Measurement of Ink Jetting Ratio—

It was confirmed that ink was being jetted from all of the nozzles prior to the initiation of experiment, the number of jetting nozzles after completion of the experiment including maintenance was counted, and the jetting ratio was calculated from the following expression:

Jetting ratio(%)=[number of jetting nozzles after maintenance]/[total number of nozzles]×100

<Evaluation Criteria>

A: If acceptance is obtained in all of the three items.

B: If acceptance is obtained in two items.

C: If acceptance is obtained in only one item.

D: If failure is obtained in all of the three items.

TABLE 4

| | Image heating | Maintenance liquid | Composition | | | | | | | | Maintenance property evaluation | |
|---|---|---|---|---|---|---|---|---|---|---|---|---|
| | | | Water-soluble organic solvent | | | | | Sodium hydrogen carbonate | Trishydroxymethyl aminomethane | Ultrapure water | Cyan ink 1 | Cyan ink 2 |
| | | | DEG | DEGmEE | DEGmBE | TEGmEE | TEGmBE | | | | | |
| Example 1 | Heated at 40° C. | Presence | 25 | | | | | | | 75 | B | B |
| Example 2 | 40° C. | Presence | | 25 | | | | | | 75 | B | A |
| Example 3 | | Presence | | | 25 | | | | | 75 | A | B |
| Example 4 | | Presence | | | | 25 | | | | 75 | B | B |
| Example 5 | | Presence | | | | | 25 | | | 75 | B | A |
| Example 6 | | Presence | | | 25 | | | 0.04 | | 74.96 | A | A |
| Example 7 | | Presence | | | 25 | | | | 0.1 | 74.9 | A | A |
| Com. Example 1 | Absence | Presence | | | 25 | | | | | 75 | A | A |
| Com. Example 2 | Heated at 40° C. | Absence | | | | — | | | | | C | D |

Unit: parts
DEG: Diethylene glycol
DEGmEE: Diethylene glycol monoethyl ether
DEGmBE: Diethylene glycol monobutyl ether
TEGmEE: Triethylene glycol monoethyl ether
TEGmBE: Triethylene glycol monobutyl ether As shown in the Table 4, in the Examples, jettability upon jetting the ink containing a volatile organic solvent could be maintained satisfactorily even in a state in which the nozzle plate of the inkjet nozzle had been heated, and thus high quality images could be stably formed. On the other hand, in the Comparative Example 2 where the maintenance liquid was not used, jettability was deteriorated, and stable image formation was difficult.

In regard to the problems of the prior art, when a pigment ink is solidified as the solvent component in the ink vaporizes, it is difficult for the ink to redissolve (redisperse) while being solidified. Therefore, if the ink undergoes solidification at the nozzle area of the inkjet head where ink is jetted, the solidified ink causes clogging. Particularly, if the ink contains a volatile solvent, the solvent in the ink is prone to vaporize, and if the solvent vaporizes and is excluded, the solidified ink has poor redispersibility, thereby maintenance being difficult. As a result, there was a problem that failure in the jetting of ink or a decrease in the degree of jetting accuracy is brought about, and also wiping or the like becomes difficult when the ink solidifies at the cap and wiper areas, and the like, thereby a burden being laid on the maintenance system.

Particularly when the ink contains polymer particles, if it is attempted to carry out maintenance by washing dried-up or stuck ink with the ink itself, the degree of clogging or deposition is rather deteriorated, so that there is a high possibility of producing contrary results.

Accordingly, it is preferable to perform the removal of the dried-up ink containing polymer particles, by redispersing the polymer particles using a washing liquid other than the ink, or the like.

The invention was made under such circumstances, and according to the invention, there can be provided an image forming method which can stably form desired images over a long time, even with a constitution in which polymer particles are incorporated in an ink composition containing a volatile solvent.

All publications, patent applications, and technical standards mentioned in this specification are herein incorporated by reference to the same extent as if each individual publication, patent application, or technical standard was specifically and individually indicated to be incorporated by reference.

What is claimed is:

1. An image forming method comprising:
    jetting an ink composition containing a pigment, a volatile water-soluble organic solvent, polymer particles and water, from a heated nozzle plate of an inkjet head onto a recording medium, wherein a temperature of the nozzle plate is equal to or greater than a temperature at which the ink spreads into a film when heated; and
    applying a maintenance liquid on a nozzle surface of the nozzle plate after jetting.

2. The image forming method of claim 1, wherein the temperature of the nozzle plate is 30° C. or higher.

3. The image forming method of claim 1, wherein a boiling point of the water-soluble organic solvent is 285° C. or lower.

4. The image forming method of claim 1, wherein the pigment is a water-dispersible pigment having at least a part of a surface thereof coated with a polymeric dispersant.

5. The image forming method of claim 1, wherein the polymer particles are self-dispersing polymer particles.

6. The image forming method of claim 5, wherein the self-dispersing polymer particles have a carboxyl group.

7. The image forming method of claim 1, wherein the maintenance liquid contains at least water.

8. The image forming method of claim 1, wherein the maintenance liquid contains an organic solvent in an amount of 5% by mass to 50% by mass relative to a total liquid amount of the maintenance liquid.

9. The image forming method of claim 8, wherein the organic solvent contained in the maintenance liquid is at least one selected from the group consisting of an alcohol-based solvent and an ether-based solvent.

10. The image forming method of claim 1, further comprising wiping the nozzle surface after applying the maintenance liquid on the nozzle surface.

* * * * *